US012627617B2

(12) United States Patent (10) Patent No.: US 12,627,617 B2
Ansari et al. (45) Date of Patent: May 12, 2026

(54) GLOBAL SYSTEM INTERCONNECT FOR AN INTEGRATED CIRCUIT

(71) Applicant: XILINX, INC., San Jose, CA (US)

(72) Inventors: Ahmad R. Ansari, San Jose, CA (US); John O'Dwyer, Kildare (IE)

(73) Assignee: XILINX, INC., San Jose, CA (US)

( * ) Notice: Subject to any disclaimer, the term of this patent is extended or adjusted under 35 U.S.C. 154(b) by 560 days.

(21) Appl. No.: 18/089,775

(22) Filed: Dec. 28, 2022

(65) Prior Publication Data

US 2024/0223513 A1     Jul. 4, 2024

(51) Int. Cl.
| | |
|---|---|
| H04L 49/102 | (2022.01) |
| H04L 49/109 | (2022.01) |
| H04L 49/15 | (2022.01) |

(52) U.S. Cl.
CPC .......... H04L 49/102 (2013.01); H04L 49/109 (2013.01); H04L 49/15 (2013.01)

(58) Field of Classification Search
CPC ........... G06F 15/7825; G06F 15/17362; H04L 49/102; H04L 49/15; H04L 49/109
See application file for complete search history.

(56) References Cited

U.S. PATENT DOCUMENTS

| | | | | |
|---|---|---|---|---|
| 2012/0195321 | A1 * | 8/2012 | Ramanujam | ........ H04L 12/4637 |
| | | | | 370/405 |
| 2015/0117267 | A1 | 4/2015 | Lih et al. | |

OTHER PUBLICATIONS

International Search Report and Written Opinion for PCT/US2023-035540 dated Feb. 15, 2024.
Bourduas, Stephan, et al., "Modeling and evaluation of ring-based interconnects for Network-on-Chip", Journal of Systems Architecture, vol. 57, pp. 39-60 (2011).
Ausavarungnirun, Rachata, et al., "Design and Evaluation of Hierarchical Rings with Deflection Routing", 2014 IEEE 26th International Symposium on Computer Architecture and High Performance Computing.
Bourduas, Stephan, et al., "Latency Reduction of Global Traffic in Wormhole-Routed Meshes Using Hierarchical Rings for Global Routing", IEEE (2007).
Bourduas, Stephan, et al., "A Quality-Drive Design Approach for NoCs", IEEE Design & Test of Computers, IEEE Service Center, vol. 25, No. 5 (2008).

* cited by examiner

*Primary Examiner* — Huy D Vu
*Assistant Examiner* — Bao G Nguyen
(74) *Attorney, Agent, or Firm* — Patterson + Sheridan, LLP

(57) ABSTRACT

Embodiments herein describe an integrated circuit (IC) which includes a global ring that interconnects multiple local rings distributed throughout the IC. In one embodiment, the global ring is connected to the local rings using respective switches. The global ring (and the switches) interconnect the local rings so that a node coupled to one of the local rings can communicate with a node connected to another local ring.

11 Claims, 6 Drawing Sheets

GLOBAL SYSTEM INTERCONNECT FOR AN INTEGRATED CIRCUIT

TECHNICAL FIELD

Examples of the present disclosure generally relate to ring interconnects in an integrated circuit.

BACKGROUND

A system on chip (SoC) (e.g., a field programmable gate array (FPGA), a programmable logic device (PLD), or an application specific integrated circuit (ASIC)) can contain a packet network structure known as a network on a chip (NoC) to route data packets between logic blocks in the SoC—e.g., programmable logic blocks, processors, memory, and the like.

Because the NoC is in-band communication, typically most (or all) major communications are done through the NoC. As such, NoCs are high performance but also very costly. Additionally, many hardware blocks in a SoC do not have NoC interfaces such as transceivers, input/output (I/O) elements, voltage/temperature monitors, or phase locked loops (PLLs) since they do not require high performance. These hardware blocks may still need to communicate with each other or with a Platform Management Controller. Also, some blocks that have NoC interface still prefer to have their control be done through sideband interfaces to allow exclusivity in control and also less intrusion on their in-band traffic.

SUMMARY

Techniques for defining a global ring coupled to local rings in an integrated circuit are described. One example is an integrated circuit that includes a global ring comprising a plurality of switches, a plurality of local rings distributed throughout the IC wherein each of the plurality of local rings is coupled to the global ring by a respective one of the plurality of switches, and a plurality of nodes coupled to the plurality of local rings where the global ring is configured to route a packet received from a first node of the plurality of nodes coupled to a first ring of the plurality of local rings to a second node of the plurality of nodes coupled to a second ring of the plurality of local rings.

Another example is a method for transmitting packets between nodes communicatively coupled by a ring in an IC. The method includes receiving only a first portion of a packet over multiple clock cycles at a first node coupled to the ring, determining whether the first node is the destination of the packet based on the first portion, upon determining the first node is the destination of the packet, receiving a remaining portion of the packet over multiple additional clock cycles at the first node, and forwarding a null packet to a next node in the ring in parallel with receiving the remaining portion of the packet during the multiple additional clock cycles.

Another example is an integrated circuit that includes a global ring comprising a plurality of switches, a plurality of local rings where each of the plurality of local rings is coupled to the global ring by a respective one of the plurality of switches, a plurality of nodes coupled to the plurality of local rings where the global ring and at least two of the plurality of switches are used to route a packet received from a first node coupled to a first ring of the plurality of local rings to a second node coupled to a second ring of the plurality of local rings.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
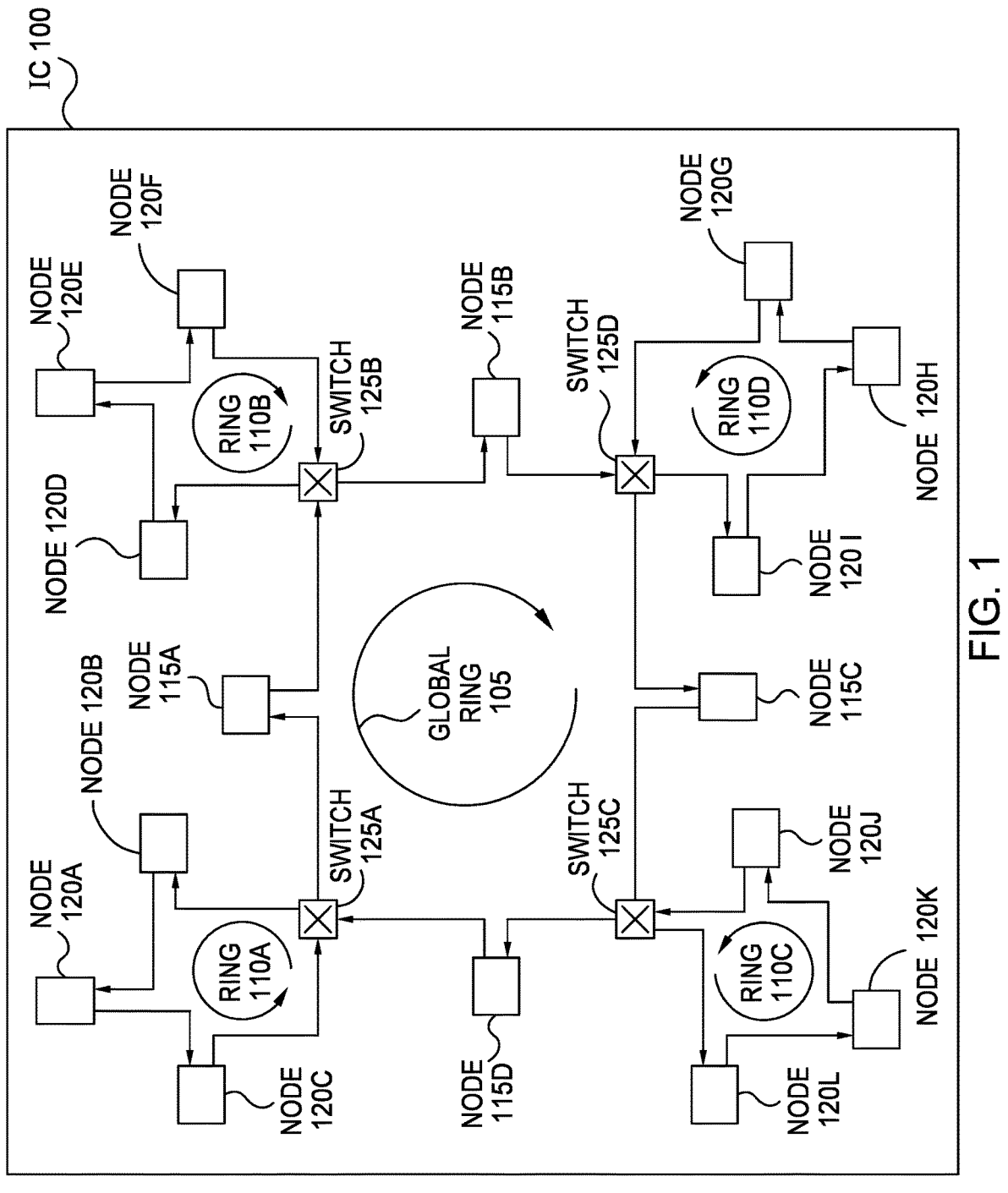
FIG. 1 is a block diagram of a global ring interconnecting multiple local rings in an integrated circuit, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe an integrated circuit (IC) such as a SoC, FPGA. ASIC, etc. which includes a global ring that interconnects multiple local rings. In one embodiment, the global and local rings form a side-band communication interconnect between distributed blocks on the IC through which the blocks can communicate with one another and with a controller or the application processors. This interconnect is a low-cost ring interconnect (relative to a NoC) which is referred to as the Global Communication Ring (GCR) that can be used for global communication and control across relevant hardware blocks with minimal or no configuration. That is, the GCR can operate when an IC is first powered on, without waiting to be configured. In some embodiments, the GCR can be used to communicate errors, interrupts, secure control, side-band communication, and monitoring capabilities throughout the entire IC.

FIG. 1 is a block diagram of a global ring 105 interconnecting multiple local rings 110A-D in an integrated circuit 100, according to an example. The combination of the global ring 105 and the local rings 110A-D are one example of a GCR. In one embodiment, the global ring 105 and the local rings 110A-D communicatively couple hardware blocks (e.g., nodes) that are distributed throughout the IC 100.

As shown, some nodes (i.e., nodes 115A-D) are connected to the global ring 105, while other nodes (i.e., nodes 120A-L) are connected to the local rings 110A-D. Further, some or all of the nodes 115, 120 may also be connected to a NoC (not shown) in the IC 100. For example, nodes 115, 120 that are transceivers or I/O elements may not be connected to the NoC, but a controller interface may be coupled to both the NoC and one of the global ring 105 or a local ring 110. In addition, there may be other interconnects besides the rings and the NoC to which the nodes 115, 120 may be connected.

The global ring 105 is connected to the local rings 110 via switches 125. In this example, there is a one-to-one relationship where one switch is used to route packets between the local ring 110 and the global ring 105. Put differently, the switches 125 provide an interface where packets inserted into a local ring 110 can be sent to the global ring 105 and packets in the global ring 105 can be routed to a local ring 110. Moreover, one or more of the local rings 110 can include a plurality of sub-local rings (e.g., a third level in the hierarchy) each of which is connected to the local ring 110 using a respective switch.

In one embodiment, the nodes 115, 120 can both insert packets into a respective ring and can receive packets from the ring. However, in other embodiments, some of the nodes 115, 120 may only transmit packets to a ring, or only receive packets from a ring. Moreover, while FIG. 1 illustrates nodes 120 that are coupled to the global ring 105 which can insert and/or receive packets, in other implementations there may not be any nodes connected to the global ring 105. In that case, the global ring 105 may be used to route packets between the local rings 110.

Packets can be routed through the GCR using several different scenarios. In one example, a node 120 may insert a packet on a local ring 110 that is destined for a node 120 on the same local ring. In that case, the packet can traverse the local ring 110 (in the dedicated direction) until reaching the destination node. The other nodes in the local ring 110 that are not the destination of the packet simply forward the packet to the next node in the ring 110.

In another example, a node 120 may insert a packet on a local ring 110 that is destined for a node 115 on the global ring 105. In that case, the packet traverses the local ring 110 (in the dedicated direction) until reaching the switch 125 which then inserts the packet into the global ring 105. The packet then traverses the global ring (in the dedicated direction) until reaching the destination node 115.

In another example, a node 120 may insert a packet on a local ring 110 that is destined for a node 120 on another local ring 110. In that case, the packet traverses the local ring 110 until reaching the switch 125 which then inserts the packet into the global ring 105. The packet then traverses the global ring (in the dedicated direction) until reaching the switch 125 corresponding to the local ring 110 that includes destination node 120. The switch 125 inserts the packet into the local ring where it traverses the local ring 110 until reaching the destination node 120.

In another example, a node 115 in the global ring 105 inserts a packet in the global ring 105 that is destined for another node 115 connected to the global ring 105. In that case, the packet traverses the global ring 105 in the dedicated direction until reaching the destination node 115. The other nodes in the global ring 105 that are not the destination of the packet simply forward the packet to the next node in the ring 105.

In another example, a node 115 in the global ring 105 inserts a packet in the global ring 105 that is destined for a node 120 connected to a local ring 110. In that case, the packet traverses the global ring 105 in the dedicated direction until reaching the switch for the local ring with the destination node 120. The switch 125 inserts the packet into the local ring 110 where it circles the ring until reaching the destination node 120.

In one embodiment, the GCR provides an infrastructure for a controller in the IC 100 to pass eFuse information to the different hardware blocks (e.g., the nodes 115, 120) on the IC 100 before those blocks are used. The eFuse information can include IP-Enablement with the approved/compliant performance, repair information, and potential keys. For example, the controller may be one of the nodes connected to the global ring 105 or one of the local rings 110.

In one embodiment, the GCR provides an interconnect for hardware blocks on the IC 100 and chiplets which may be connected to the IC 100 to pass interrupts to the controller and a processor subsystem (PS) on the IC 100 to allow firmware and software interactions. The chiplets can be separate ICs which are connected to the IC 100 via a substrate (e.g., an interposer).

In one embodiment, the GCR provides an interconnect to pass error information from the nodes distributed on the IC and from the chiplets to an error aggregation module in the controller on the IC 100.

In one embodiment, the GCR provides an interconnect for the nodes on the IC and controllers on the chiplets, to pass control information to one another.

In one embodiment, the GCR provides an interconnect for the controller on the IC 100 to broadcast information to a certain group of nodes 115, 120 on the IC 100. An example of a group of nodes could be configuration interface managers (CIMs) which are responsible for configuring regions of the IC 100. By having the CIMs communicate through a sideband during initialization, a CIM can be programmed or even disabled to restrict the usage of a region on the device. In one embodiment, the IC 100 is base die of multi-die device where other ICs are stacked above the base die. In that case, the CIMs could configure respective 3D slices of a stacked multi-die device.

In one embodiment, the GCR provides an interconnect for continuous communication between a root system monitor (SysMon) in the controller in the IC 100 and Satellite SysMons distributed through the IC 100, or the Root SysMons on chiplets coupled to the IC 100. In one embodiment, the SysMons are responsible for monitoring voltage and temperature.

In one embodiment, the GCR provides a communication interconnect to allow various agents to be implemented to communicate to hardened blocks on behalf of Programmable FPGA fabric in the IC or chiplets.

In one embodiment, the propagation of a packet on a GCR ring is deterministic and does not stall. This assumes there is no need for additional pipeline stages on the paths between one node to another. If, the speed cannot be met, additional pipeline stages between nodes can be included.

Figure 2:
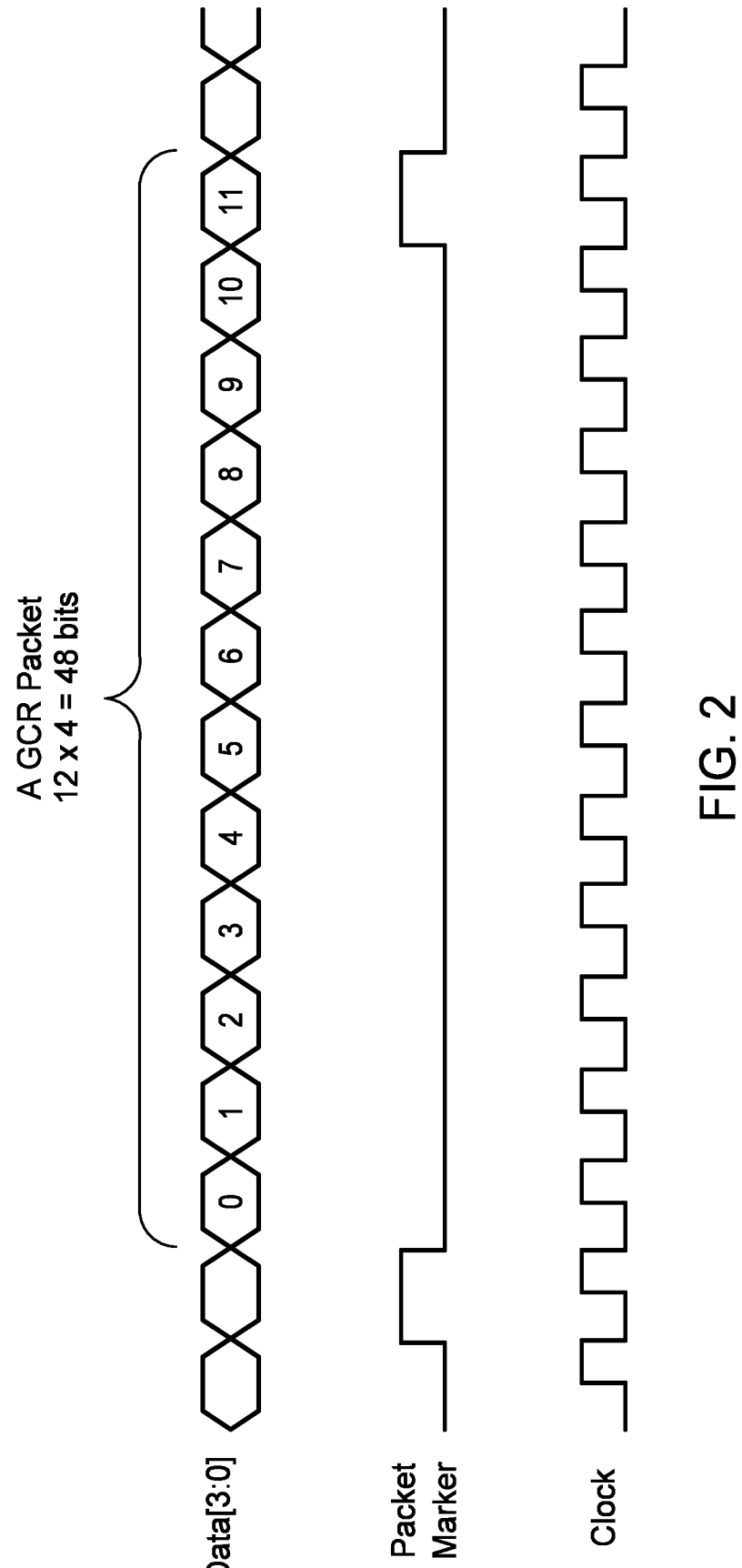
FIG. 2 illustrates transmitting packets in a ring, according to an example.

FIG. 2 illustrates transmitting packets in a ring, according to an example. In one embodiment, the global ring and each of the local rings transmit four data signals and one control signal in parallel. However, other embodiments may transmit more (or fewer) data signals in parallel. The example shown in FIG. 2 includes a GCR packet that is 48 bits long. Given that the rings transmit 4 bits of data each cycle (also referred to as a nibble), a GCR packet uses 12 cycles or nibbles to be transmitted or received at a node. In one embodiment, each packet contains a header (e.g., the first four bits) that describes the type of the packet. The remaining payload of the packet can include source and destination addresses depending on the packet type.

In one embodiment, the rings are formed from GCR links that connect each node or switch to another node or switch in the ring. These links can include four data signals (wires) and a packet marker signal. FIG. 2 illustrates how the packets are communicated through a link. As shown, the packet marker signal identifies that a new packet will start in the following cycle. The 4-bits that are sampled in the next cycle contain the header for the packet which identifies the packet type. In this example, each packet takes 12 cycles to traverse a node in its entirety.

Figures 3, 4:
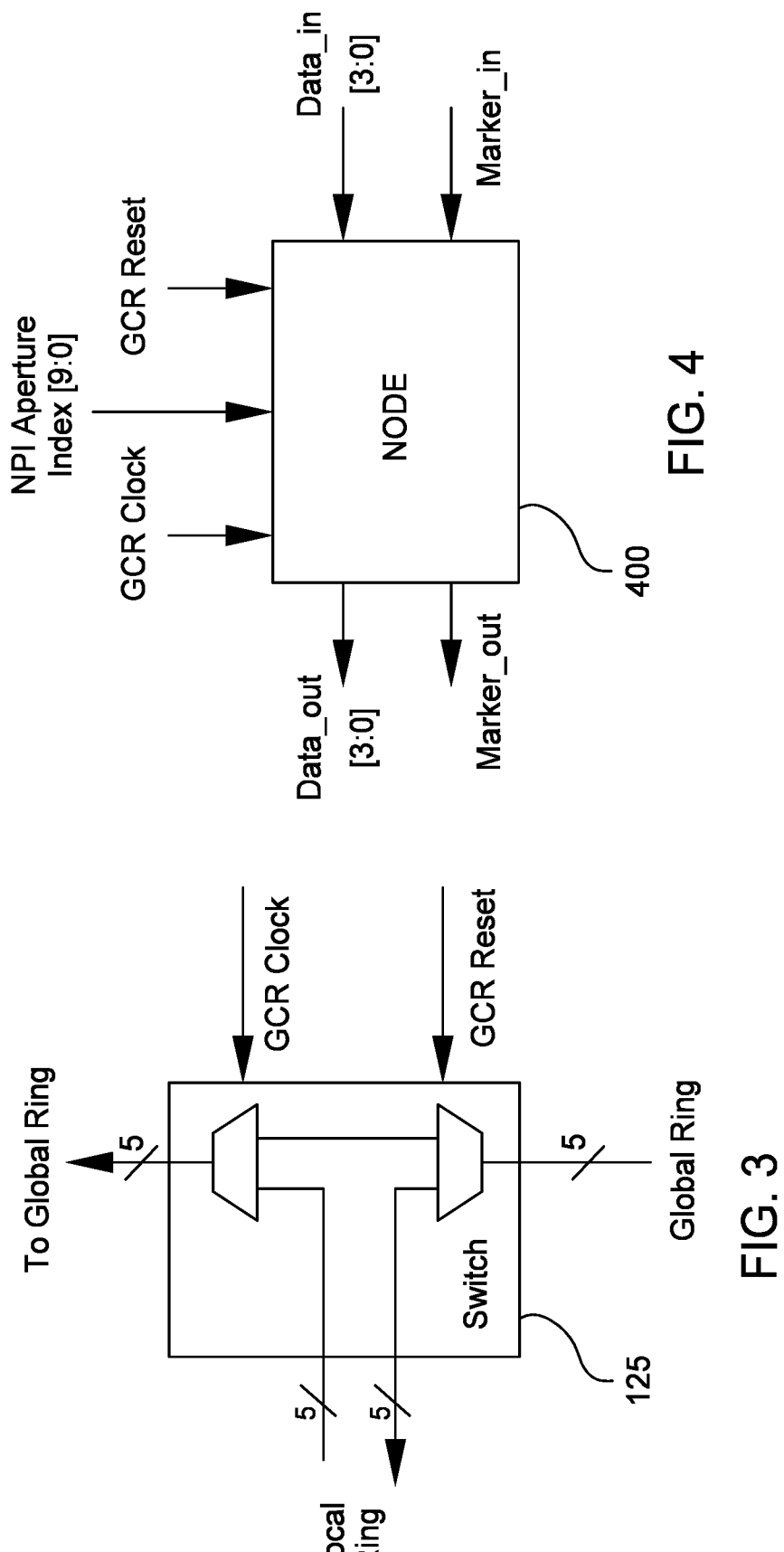
FIG. 3 illustrates a switch between the global and local rings, according to an example.
FIG. 4 illustrates a node connected to a ring, according to an example.

FIG. 3 illustrates a switch 125 between the global and local rings, according to an example. As mentioned above, a switch connects a local ring to the global ring. In one embodiment, the switch 125 is located on the global ring and inspects the GCR packets that are flowing through it. If the destination address for a packet is within the address aperture that is associated with the corresponding local ring, the switch 125 buffers the packet and passes it to the first available slot on the local ring.

If the switch 125 cannot buffer more packets and there is another packet intended for its corresponding local ring, the packet will continue its path on the global ring until it gets back to the switch 125 where it will again try to insert the packet into the local ring (assuming its buffer is no longer full). The same transfer model can be used for packets that are sourced in the local ring and targeted for a node connected to the global ring or to another local ring. That is, if the switch 125 cannot buffer additional packets, the packets may continue to circle the local ring until the switch 125 has capacity for additional packets.

FIG. 4 illustrates a node 400 connected to a ring, according to an example. The node 400 can be either a node connected to the global ring or a node connected to a local ring.

In one embodiment, the GCR node 400 has enough buffering to hold one complete outbound GCR packet (e.g., 48 bits) and capture one complete inbound GCR packet. In some cases, it may be preferred that the GCR node 400 provides buffering for more packets that this. In that case, the node 400 can construct the new packets while the first packet is being transmitted on the ring.

In one embodiment, each NoC Peripheral Interconnect (NPI) Slave and NPI Roots includes a GCR node. In one example, NPI is another interconnect that can configure the nodes that are connected to it. In one embodiment, each of the GCR nodes is also connected to the NPI interconnect and use the same address for both interconnect. However, it is possible for a node to be on the NPI interconnect and not on the GCR ring.

The NPI roots may be included in CIMs. The NPI Root that is in a CIM block for the controller in the IC may have a special GCR node that operates on behalf of the entire controller, PS, and the Root SysMon.

To initialize the GCR (e.g., in response to a GCR reset signal), a GCR node 400 corresponding to the controller in the IC can inject the packet markers along with null packets in the global ring for certain number of predetermined cycles. During the initialization phase, the GCR switches (e.g., the switch 125 in FIG. 3) broadcast the null packets and the packet markers to both of their egress ports (e.g., the egress port coupled to the global ring and the egress port coupled to its corresponding local ring). In one embodiment, this continues until a special service packet is sent through the global ring that reaches a GCR switch. At that point, the switch enters the operational mode or phase in which it routes packets based on their destination.

When a node 400 receives a packet, it stores the first portion of the packet (e.g., 16 bits) that are transferred in the first number of cycles (e.g., 4 cycles). Using that information, the node 400 is able to determine if the packet is targeted for that node 400, or not. If the packet is not targeted for that node 400, at the fifth cycle, the packet will start leaving the node; otherwise, a general null packet or a SysMon null packet is pushed on the ring at the fifth cycle depending on if the node is a SysMon block, or not.

During operation (e.g., after initialization), the packet slots are cleared or reused by different nodes. In one embodiment, this responsibility belongs to the node 400 that is the destination of the packet. In certain cases, when the packet is a broadcast operation by the controller in the IC, the controller may be responsible for clearing the packet. In one embodiment, bits [15:14] of a GCR packet which are the last 2 bits in the fourth nibble of the packet are labeled as Count[1:0] and are used to track the packets that were not captured for some reason and are alive for some time in the GCR ring. Every time a packet passes the controller or is entered on the local ingress port of a GCR switch (sourced from a node on the local GCR ring), if the Count[1:0] value is not 0x11, Count[1:0] is incremented; and the packet will continue its travel on the ring.

If the controller determines the Count[1:0] is 0x11 in a packet, an error can be generated and logged internally in the controller with the packet information, and the slot on the ring is cleared and converted to its corresponding null packet or carry another outstanding packet of the same type.

In the case of a GCR switch, if Count[1:0] is 0x11, the packet is automatically passed to the global ring allowing it to be routed to the controller which then generates the error.

Figure 5:
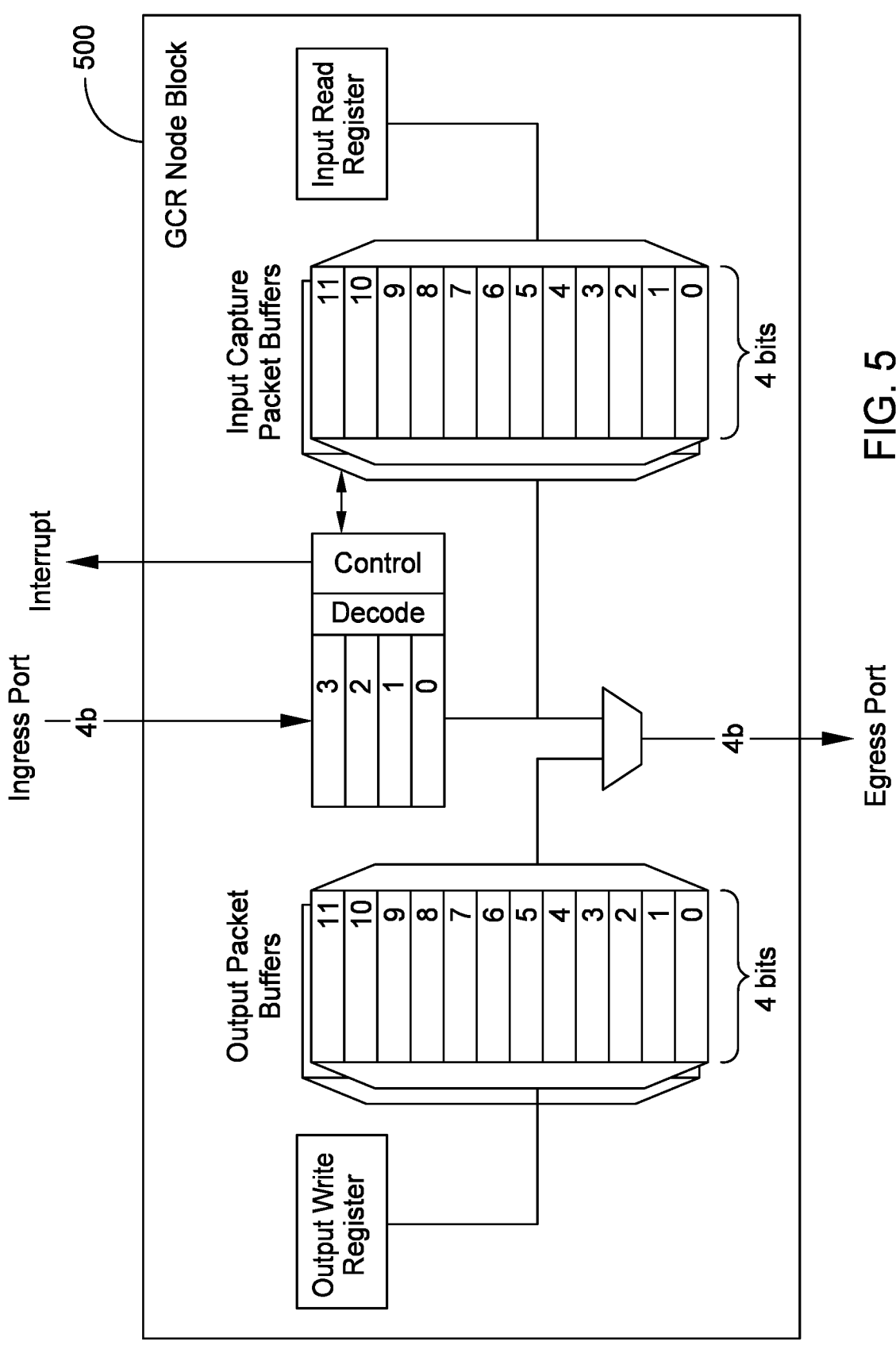
FIG. 5 illustrates microarchitecture of a node connected to a ring, according to examples.

FIG. 5 illustrates microarchitecture of a node connected to a ring, according to examples. The node 500 can be either a node connected to the global ring or a node connected to a local ring. In one embodiment, the first four nibbles (16 bits) of every packet is buffered in the node 500. Assuming there is a maximum of 1024 64 KB apertures in NPI on the IC, nibble 0 can identify the packet type and nibbles 1, 2, and 3 include a 10-bit aperture index. In this manner, the first four nibbles of every packet identify whether the inbound packet is targeted for the current node 500 or, if these nibbles are blank (and the null packet is the appropriate type), then the node 500 can use this packet to send an outbound packet.

Put differently, by buffering and evaluating a first portion of a packet, the packet can determine that the packet is not a null packet and whether the node is the destination for the packet, or if the packet is a null packet, what type of packet can be inserted in its place. That is, some spots on the ring may be reserved for a particular type of traffic. For example, when initializing the GCR, one out of every four null packets may be reserved for a particular type of traffic (or to be used by a particular type of node). For instance, there may be SysMon null packets and non-SysMon null packets inserted into the ring during initialization. If the node 500 receives a SysMon null packet but it is a non-SysMon node (or does not have a SysMon packet), then it cannot replace the null packet. Instead, it forwards the SysMon null packet to the next node/switch in the ring. In this embodiment, the node 500 can replace a packet with one it wishes to send to another node in the GCR if it receives a null packet and that null packet is of the appropriate type. In this manner, a portion of the bandwidth of the GCR can be reserved for different types of traffic (e.g., SysMon and non-SysMon traffic).

In FIG. 5, the node 500 includes two output packet buffers to store the packets that are waiting to be sent out to another node connected to the GCR.

The node 500 includes two input capture packet buffers which can store packets targeted for the node 500 before they are retrieved, and the buffers are marked as empty.

In one embodiment, if there is an inbound packet targeted for the node 500 and neither of the input capture buffers are available, the node 500 can forward the packet on its egress port to a downstream node where the packet circles the ring before arriving back at the node 500. Ideally, by that time the input capture packet buffers have room to receive the packet. Thus, the node 500 can have multiple opportunities to capture a packet that is intended for the node 500.

When a packet is captured by the node 500, the outbound packet is marked as null and of the same type as the packet that was captured by the node 500. That is, the node 500 replaces a packet it received with an outbound null packet of the same type. That way, the reservation of the bandwidth of the GCR is maintained between different packet types as those packets are inserted and then removed from the GCR.

Figure 6:
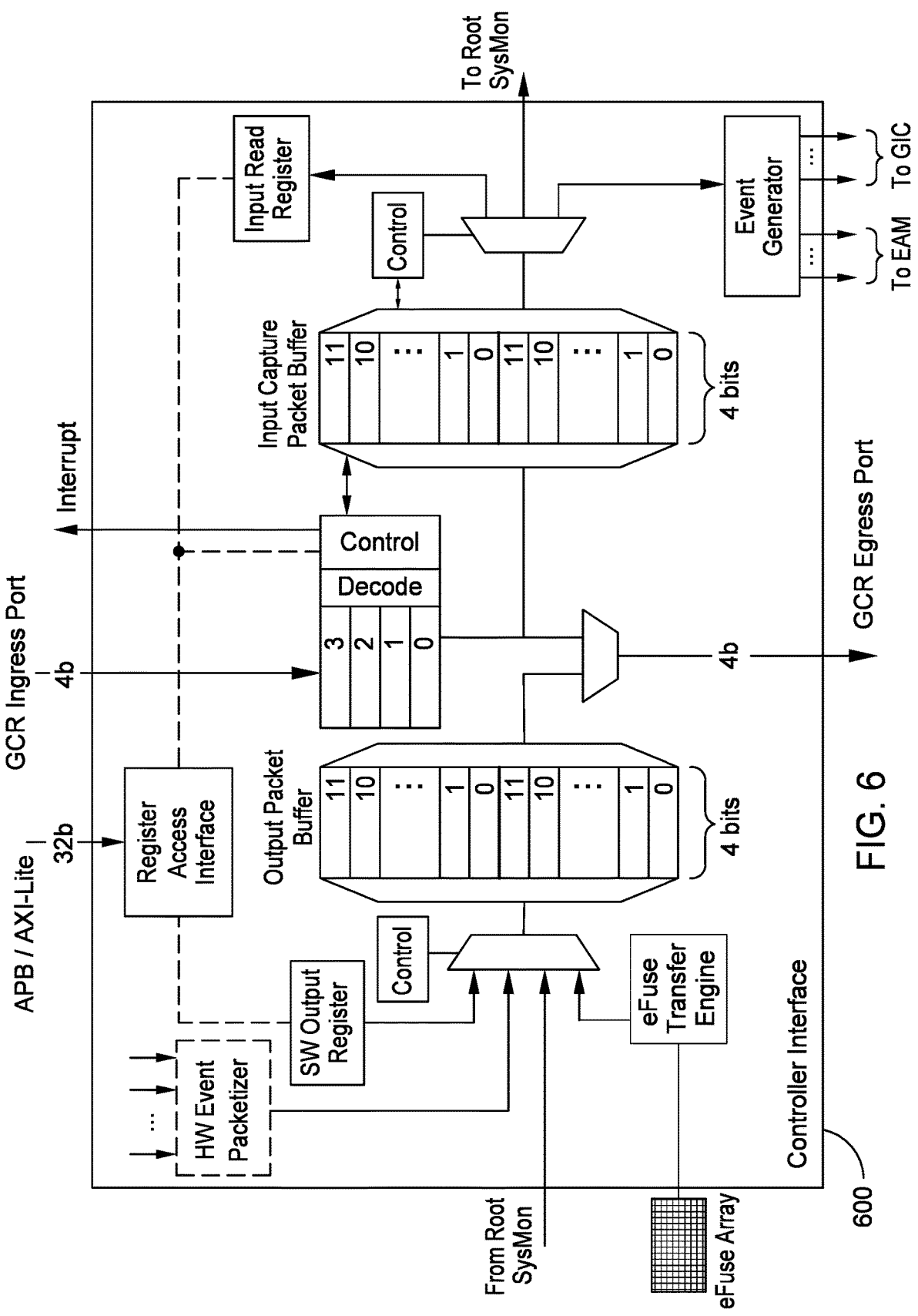
FIG. 6 illustrates a controller interface, according to examples.

FIG. 6 illustrates a controller interface 600, according to examples. That is, FIG. 6 illustrates an interface 600 used to couple a controller (e.g., a Platform Management Controller) in the IC to a GCR. In one embodiment, the controller interface 600 is node coupled to the global ring, but in other embodiments, the interface 600 may be a node coupled to a local ring of the GCR.

In one embodiment, the controller interface 600 receives errors from remote nodes through a Generic Interrupt Controller (GIC). If the IC is part of a multi-die device that is coupled to chiplets or stacked ICs, the interface 600 can receive errors from the other dies and chiplets in the device and route them to an error aggregation module (EAM) in the controller. In addition to errors, interrupts can also be communicated by remote nodes through GIC to the processors in the system. In this embodiment, the interrupts are captured from the GCR in the controller interface 600 as shown and from there are passed to a, e.g., a GIC associated with a specific processor in the system.

In one embodiment, the controller interface 600 for, e.g., a Platform Management Controller, receives interrupts from remote blocks in the IC and interrupts from other dies and chiplets (if part of a multi-die device) and routes these interrupts to the controller and PS.

In one embodiment, the controller interface 600 allows software and hardware events to be packetized and propagate through the GCR to various destinations connected to the GCR which can be distributed throughout the IC.

In one embodiment, the controller interface 600 enables the controller to broadcast events to every CIM in the IC, each being responsible for configuring on segment on the device.

In one embodiment, the controller interface 600 provides an infrastructure for the controller to pass eFuse information to the nodes on the IC before the nodes are configured for use. The eFuse information can include an IP-Enable signal with the approved/compliant performance, repair information, and potential keys.

In one embodiment, the controller interface 600 allows Root SysMon within the controller to communicate to the Satellite SysMons on the IC or the Root SysMons in chiplets attached to the IC.

Figure 7:
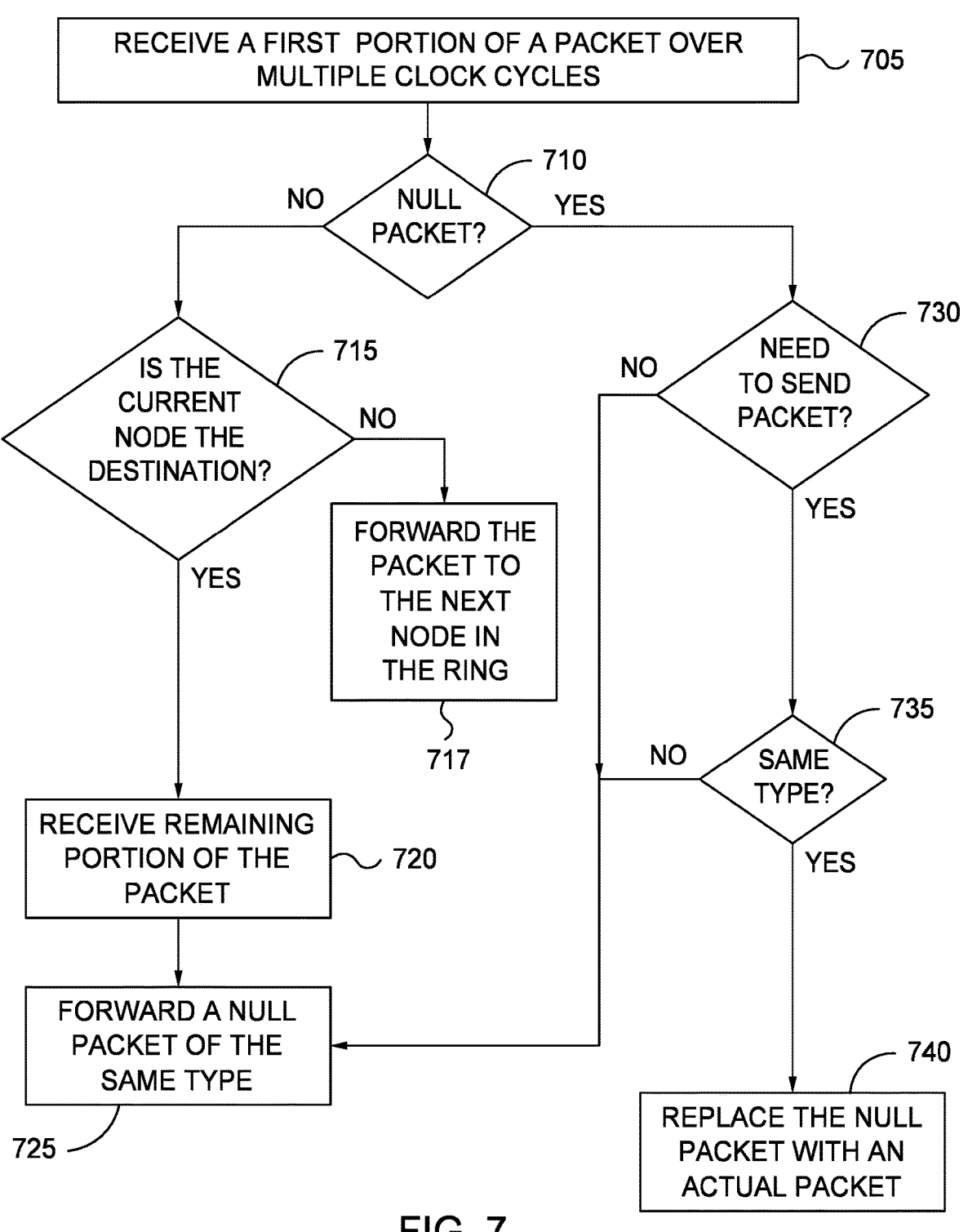
FIG. 7 is a flowchart for transmitting packets on a ring, according to an example.

FIG. 7 is a flowchart for a method 700 for transmitting packets on a ring, according to an example. The method 700 can be used in an IC that has multiple rings (e.g., the GCR illustrated in FIG. 1) or an IC that has only one ring.

At block 705, a node on a ring (e.g., a node 115 on the global ring 105 or a node 120 on a local ring 110 in FIG. 1) receives a first portion of a packet over multiple clock cycles. Using the example above in FIG. 2, the node may receive four bits of the packet every clock cycle. The first 16 bits (e.g., the first four clock cycles) may have sufficient information for the node to perform the rest of the method 700. Thus, the node may not have received the entire packet when it performs many of the blocks in the method 700.

At block 710, the node determines whether the packet is a null packet based on the first received portion. If the packet is not null (i.e., the packet was placed on the ring by another node rather than just a null, placeholder packet), the method 700 proceeds to block 715 where the node determines whether it is the destination of the packet.

If the node is not the destination, the method 700 proceeds to block 717 where the node forwards the packet to the next node in the ring. That is, the node can begin forwarding the first portion of the packet to the next node. As the node receives the remainder of the packet over additional clock cycles, it can forward the portion of the packet it has already received to the next node. Thus, the number of clock cycles used to receive the first portion is a delay or buffer between when a node begins to receive a packet from an upstream node in the ring and when it begins to transmit a packet to a downstream node in the ring.

If, however, the node is the destination for the packet, the method 700 instead proceeds to block 720 where the node receives the remaining portion of the packet over multiple clock cycles. For example, the first portion of the packet may be received in the first four clock cycles while the remaining portion of the packet is received over eight more clock cycles. This packet is then removed from the ring. Once received, the node can process the packet or use a different communication path to forward the data in the packet to other circuitry in the IC.

At block 725, the node forwards a null packet of the same type to the next node (i.e., the downstream node) in the ring. Notably, block 725 can occur in parallel with block 720. For example, once the node determines at block 715 that it is the destination, it can in the next clock cycle begin forwarding a null packet to the next node using an egress port while the node continues to receive the remaining portion of the packet at an ingress port in parallel.

Returning to block 710, if the received packet is a null packet, the method 700 proceeds to block 730 where the node determines whether it has packets to send on the ring. This packet can be to a destination node on the same ring or to a destination node on a different ring that is connected to the current ring by a switch as discussed in FIG. 1.

If the node does not have a packet it wants to send, the method 700 proceeds to block 725 where the node begins forwarding a null packet of the same type as the null packet that was received to the next node in the ring. This gives the next node a chance to send any packets it may have.

However, if the node does have a packet it wants to send, the method 700 proceeds to block 735 where the node determines whether the packet is the same type as the null packet (e.g., both the null packet and the actual packet are SysMon type packets). If no, the method 700 proceeds to block 725 where the node is not permitted to insert its packet into the ring and instead forwards the null packet. But if the packet is the same type as the null packet, the method proceeds to block 740 where the node replaces the null packet with the actual packet of the same type. That is, after receiving the first portion of a null packet, the node can begin to send an actual packet to the next hop without having to wait until receiving the remaining portion of the null packet.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC), comprising:
a global ring comprising a plurality of switches;
a plurality of local rings distributed throughout the IC, wherein each of the plurality of local rings is coupled to the global ring by a respective one of the plurality of switches; and
a plurality of nodes coupled to the plurality of local rings, wherein the global ring is configured to route a packet received from a first node of the plurality of nodes coupled to a first ring of the plurality of local rings to a second node of the plurality of nodes coupled to a second ring of the plurality of local rings, wherein, when receiving the packet, the second node is configured to:
receive only a first portion of the packet over multiple clock cycles;
determine whether the second node is the destination of the packet based on the first portion;
upon determining the second node is the destination of the packet, receive a remaining portion of the packet over multiple additional clock cycles; and
forward a null packet to a next node in the second ring in parallel with receiving the remaining portion of the packet during the multiple additional clock cycles.

2. The IC of claim 1, wherein a second packet inserted by the first node that is destined for a third node coupled to the first ring is transmitted to the third node by the first ring without traversing through the global ring.

3. The IC of claim 2, further comprising:
a fourth node coupled to the global ring, wherein a third packet inserted by the first node that is destined for the fourth node is transmitted by the first ring and the global ring to the fourth node.

4. The IC of claim 1, wherein the global ring and the plurality of local rings permit packet flow in only one direction.

5. The IC of claim 1, wherein the packet traverses through at least two of the plurality of switches when being routed between the first and second rings by the global ring.

6. The IC of claim 1, wherein, before the packet is received at the second node, the packet is received at a third node coupled to the second ring, wherein the third node is configured to:
receive only the first portion of the packet over multiple clock cycles;
determine whether the third node is the destination of the packet based on the first portion;

upon determining the third node is not the destination of the packet, receive the remaining portion of the packet over multiple additional clock cycles; and
forward the first portion of the packet to the second node in parallel with receiving the remaining portion of the packet during the multiple additional clock cycles.

7. An IC, comprising:
a global ring comprising a plurality of switches;
a plurality of local rings, wherein each of the plurality of local rings is coupled to the global ring by a respective one of the plurality of switches; and
a plurality of nodes coupled to the plurality of local rings, wherein the global ring and at least two of the plurality of switches are used to route a packet received from a first node coupled to a first ring of the plurality of local rings to a second node coupled to a second ring of the plurality of local rings, wherein, when receiving the packet, the second node is configured to:
receive only a first portion of the packet over multiple clock cycles;
determine whether the second node is the destination of the packet based on the first portion;
upon determining the second node is the destination of the packet, receive a remaining portion of the packet over multiple additional clock cycles; and
forward a null packet to a next node in the second ring in parallel with receiving the remaining portion of the packet during the multiple additional clock cycles.

8. The IC of claim 7, wherein a second packet inserted by the first node that is destined for a third node coupled to the first ring is transmitted to the third node by the first ring without traversing through the global ring.

9. The IC of claim 8, further comprising:
a fourth node coupled to the global ring, wherein a third packet inserted by the first node that is destined for the fourth node is transmitted by the first ring and the global ring to the fourth node.

10. The IC of claim 7, wherein at least one of the plurality of local rings includes a plurality of sub-local rings connected to the at least one local ring by a plurality of respective switches.

11. The IC of claim 7, wherein, before the packet is received at the second node, the packet is received at a third node coupled to the second ring, wherein the third node is configured to:
receive only the first portion of the packet over multiple clock cycles;
determine whether the third node is the destination of the packet based on the first portion;
upon determining the third node is not the destination of the packet, receive the remaining portion of the packet over multiple additional clock cycles; and
forward the first portion of the packet to the second node in parallel with receiving the remaining portion of the packet during the multiple additional clock cycles.

* * * * *